(12) United States Patent
Raynesford et al.

(10) Patent No.: US 6,219,109 B1
(45) Date of Patent: *Apr. 17, 2001

(54) REMOTE CONTROL WITH DIRECT TV OPERATION

(75) Inventors: Steve Raynesford, Cathedral City; Paul Darbee, Santa Ana, both of CA (US)

(73) Assignee: Evolve Products, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,088

(22) Filed: Jan. 21, 1998

(51) Int. Cl.[7] .............................. H04N 7/10; H04N 7/18; H04N 5/44; H04Q 5/00; H04H 1/00
(52) U.S. Cl. .......................... 348/734; 348/734; 348/10; 348/12; 348/134; 340/825; 340/825.15; 340/825.25; 455/3.1
(58) Field of Search ................................ 348/734, 10, 12, 348/134; 340/825, 825.15, 825.25; 341/176; 455/5.1

(56) References Cited

U.S. PATENT DOCUMENTS

| 5,353,016 | * | 10/1994 | Kurita et al. ..................... 340/825.22 |
| 5,410,326 | * | 4/1995 | Goldstein .............................. 348/134 |
| 5,532,689 | * | 7/1996 | Bueno .................................. 340/928 |
| 5,594,493 | * | 1/1997 | Nemirofsky ........................... 348/13 |
| 5,603,078 | * | 2/1997 | Henderson et al. .................. 455/5.1 |
| 5,898,398 | * | 4/1999 | Kumai .................................. 341/176 |
| 5,907,350 | * | 5/1999 | Nemirofsky ........................... 348/13 |
| 5,952,936 | * | 9/1999 | Enomoto ........................ 340/825.58 |
| 5,953,047 | * | 9/1999 | Nemirofsky ........................... 348/13 |
| 5,956,025 | * | 9/1999 | Goulden et al. ...................... 345/327 |

\* cited by examiner

*Primary Examiner*—John Peng
*Assistant Examiner*—Palo Natnael
(74) *Attorney, Agent, or Firm*—Thomas R. Vigil

(57) ABSTRACT

The remote control is constructed and arranged for direct TV operation and includes; a keyboard having keys for selecting a television channel; structure and circuitry for coupling a data storage unit or signal source to said remote control; structure and circuitry for retrieving raw data or a video signal from said data storage unit; and, circuitry for directing signals containing raw data or a video signal to a signal receiving device associated with a television set.

27 Claims, 1 Drawing Sheet

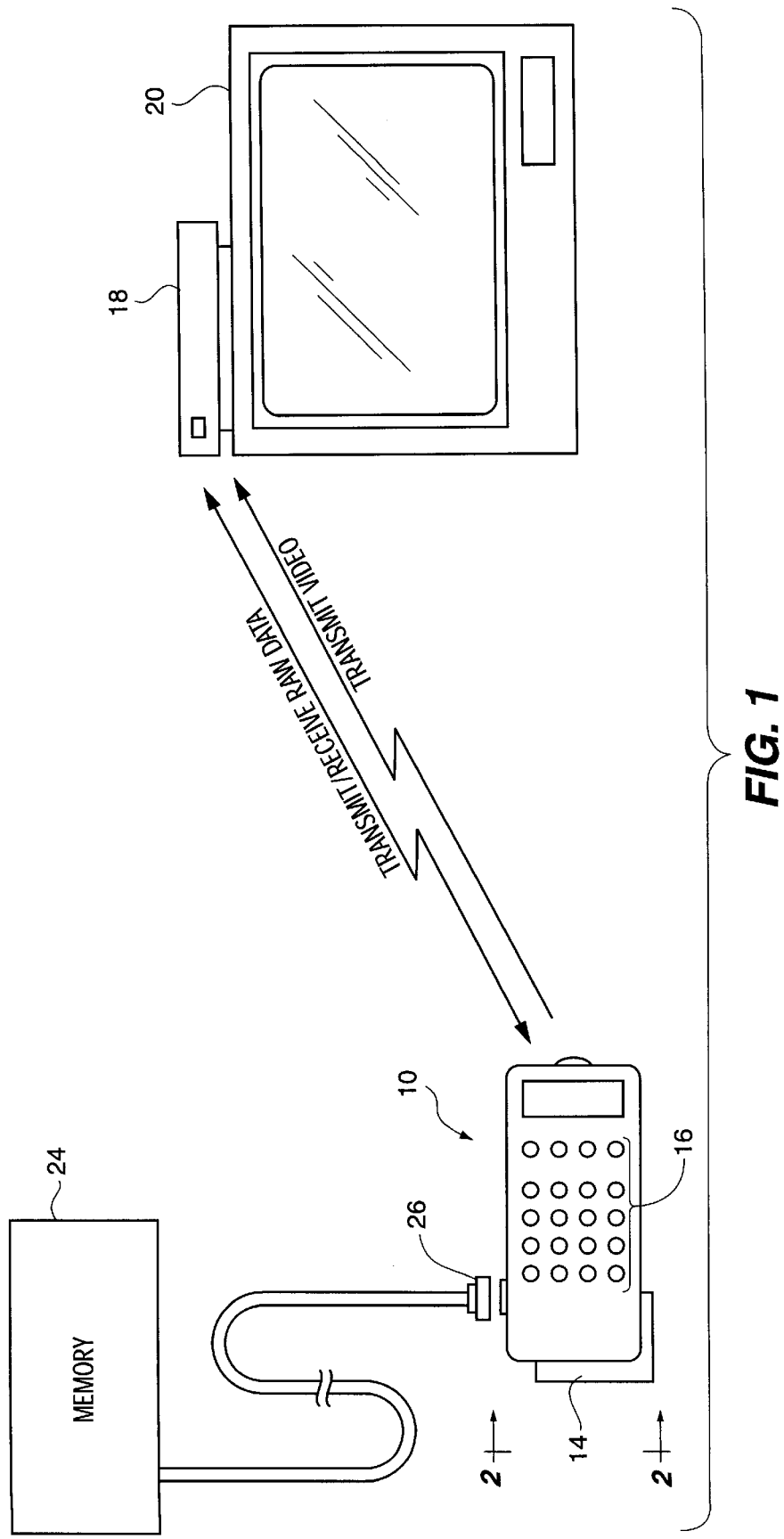

REMOTE CONTROL WITH DIRECT TV OPERATION

BACKGROUND OF THE INVENTION

1. Field of the Invention

The present invention relates to a remote control which is adapted to receive from a signal source or be connected to a memory or data storage unit or have therein a memory containing data and which has circuitry for transmitting the stored data directly to a decoder associated with a television set such as a decoder for WINK communications protocol. In one preferred embodiment, the memory or data storage unit is a "smart" card and the remote control includes a smart card reader.

2. Description of the related art including information disclosed under 37 CFR §§ 1.97–1.99

Heretofore, a large number of remote controls have been proposed for use with consumer electronic equipment, primarily television sets, VCR's and cable converter boxes associated therewith. Examples of a few of these remote controls are disclosed in the following U.S. Pat. Nos.:

| U.S. Pat. No. | Patentee |
|---|---|
| 4,959,810 | Darbee et al |
| 5,532,689 | Bueno |
| 5,594,493 | Nemirofsky |
| 5,603,078 | Henderson et al |

SUMMARY OF THE INVENTION

According to the present invention there is provided a remote control with direct TV operation. Such remote control can have structure, such as a slot in the remote control, and smart card reader circuitry inside the remote control for reading the data on the smart card. The remote control also has driver circuits for driving either an infrared transmitter or radio frequency transmitter to send encoded or encrypted data to a decoder associated with a consumer electronic device, typically a television set or a cable converter box associated with a television set. The encrypted or encoded data can be WINK communications protocol, ICAP protocol, or MPEG protocol.

A preferred protocol is the WINK communications protocol which is coming into use using the vertical blanking interval or VBI for superimposing messages or pictures on a television screen such as, for example, the batting average of a batter in a baseball game.

The memory or data storage unit can also be a memory of a computer or a CD ROM or DVD player connectable to the remote control through a serial port.

Further the data storage unit can be mounted directly in the remote control.

Still further the remote control can be provided with a receiver or transceiver for receiving the video signal or raw data directly from a local transmitter such as an IR transmitter or an RF transmitter.

The uses of such a remote control with direct TV operation are limitless and will include home movies, movies on a compact disk, DVD disc or smart card, movies or other television playable subjects on video disks, advertisements and background information on a TV show or movie or playable subjects received directly from a local transmitter serving the role of a cable provider.

BRIEF DESCRIPTION OF THE DRAWINGS

FIG. 1 is a plan view of the remote control of the present invention having a slot for receiving a smart card and a television set having a signal receiving unit associated therewith. Also shown in FIG. 1 is a modified embodiment which has a series port instead of or in addition to the smart card receiving slot to which a data storage unit such as a CD ROM or DVD player can be connected.

FIG. 2 is an end view of the remote control shown in FIG. 1, and is taken along line 2—2 of FIG. 1.

DESCRIPTION OF THE PREFERRED EMBODIMENT(S)

Referring now to FIG. 1, there is illustrated therein a remote control 10 having a smart card receiving slot 12 (FIG. 2) for receiving a smart card 14 having video and audio data therein, whereby a user of the remote control 10 can actuate certain keys or push buttons 16 on the remote control for causing the remote control to decode and/or transmit raw data or a video signal to a signal receiving device 18 which will decode the raw data to video data and supply same to a television set 20 for presenting a picture or message extracted from the raw data.

A smart card reader (not shown) is mounted in the remote control 10 and can be of the type disclosed in the Bueno U.S. Pat. No. 5,532,689 or the Henderson et al. U.S. Pat. No. 5,603,078 or the Nemirofsky U.S. Pat. No. 5,594,493, the disclosure of which are incorporated herein by reference.

Alternatively, the signal receiving device 18 can receive the video signal and simply transmit such signal to the television set for display on a used or unused video channel, e.g., channel 99.

The raw data is encoded or encrypted, such as with WINK communications protocol, and the signal receiving device 18 includes decoding circuitry for decoding WINK communications protocol. The data directly displayed from the remote control can be a still picture, a moving picture, an advertisement, a message in text format, or a video short.

With the advent of CD ROMs which can hold up to 668 megabytes of data on a compact disk and DVD players which can hold several gigabytes, in a modified form of the remote control 10 of the present invention, a memory or data storage unit 24, such as a CD ROM 24 can be coupled by an RS232 coupling 26 to the remote control 10. A three pin plug and mating serial port can be used for this purpose and can be the same as disclosed in U.S. Pat. No. 4,959,810, the disclosure of which is incorporated herein by reference.

The CD ROM 24 can be battery operated or operated from a conventional 30 AC wall socket.

The signal receiving device 18 can include decoding circuitry. Such decoding circuitry can be of the type for decoding WINK communications protocol, ICAP protocol, or MPEG protocol.

This modified embodiment of the remote control 10 has the advantage of direct TV operation for a longer period of time such as for showing a movie on an unused channel, such as channel 99.

Also, if desired, the data, such as a movie can be stored directly in a high density memory in the remote control 10.

Further, the remote control 10 can be constructed with an IR or RF receiver or transceiver for receiving data from an antenna located close by, such as from a tap antenna unit.

From the foregoing description, it will be apparent that the remote control 10 with direct TV operation of the present invention has a number of advantages, some of which have been described above and others of which are inherent in the invention. Also it will be understood that modifications, such as those described above, can be made to the remote control 10 described above without departing from the teachings of the present invention. Accordingly, the scope of the invention is only to be limited as necessitated by the accompanying claims.

We claim:

1. A remote control constructed and arranged for direct TV operation and including:
   a keyboard having keys for selecting a television channel;
   means for coupling a data storage unit to said remote control; said data storage unit being a CD ROM or DVD player for mounting a compact disc and said coupling means including a serial port in said remote control and a jack or cable extending from the CD ROM or DVD player for coupling with said serial port;
   means for retrieving raw data or a video signal, representing a complete video presentation to be displayed and/or broadcast, from said data storage unit;
   means for directing signals containing the raw data or the video signal to a signal receiving device associated with a television set for causing the video presentation to be displayed or broadcast.

2. The remote control of claim 1 wherein said data storage unit is a smart card and said means for coupling said smart card to said remote control, includes a smart card receiving slot in said remote control and smart card reading circuitry in said remote control adjacent to said slot and adapted to read said smart card.

3. The remote control of claim 1 including decoding circuitry in said remote control for decoding encoded or encrypted data received from said data storage unit.

4. The remote control of claim 1 combined with said signal receiving device associated with a television set.

5. The remote control of claim 4 wherein said raw data or video signal in said data storage unit is encoded or encrypted.

6. The remote control of claim 5 wherein said raw data or video signal is encoded or encrypted with WINK communications protocol.

7. The remote control of claim 5 wherein said raw data or video signal is encoded or encrypted with ICAP protocol.

8. The remote control of claim 5 wherein said raw data or video signal is encoded or encrypted with MPEG protocol.

9. The remote control of claim 5 wherein said complete video presentation represented by said raw data or video signal is a movie.

10. A remote control constructed and arranged for direct TV operation and including:
    a keyboard having keys for selecting a television channel;
    a receiver or transceiver mounted in said remote control for receiving raw data or a video signal, representing a complete video presentation to be displayed and/or broadcast, from a tap antenna unit; and,
    means for directing signals contains the raw data or the video signal to a signal receiving device associated with a television set for causing the video presentation to be displayed and/or broadcast.

11. A remote control constructed and arranged for direct TV operation and including:
    a keyboard having keys for selecting a television channel;
    means for mounting a data storage unit within said remote control;
    means for retrieving raw data or a video signal, representing a complete video presentation to be displayed and/or broadcast, from said data storage unit, said data storage unit being a smart card and said means for mounting said smart card within said remote control including a smart card receiving slot in said remote control and smart card reading circuitry in said remote control adjacent to said slot and adapted to read said smart card; and,
    means for directing signals containing the raw data or the video signal to a signal receiving device associated with a television set for causing the video presentation to be displayed or broadcast.

12. The remote control of claim 11 including decoding circuitry in said remote control for decoding encoded or encrypted raw data or video signal received from said data storage unit.

13. The remote control of claim 11 combined with said signal receiving device associated with a television set.

14. The remote control of claim 11 wherein said raw data or video signal in said data storage unit is encoded or encrypted.

15. The remote control of claim 14 wherein said raw data or video signal is encoded or encrypted with WINK communications protocol.

16. The remote control of claim 14 wherein said raw data or video signal is encoded or encrypted with ICAP protocol.

17. The remote control of claim 14 wherein said raw data or video signal is encoded or encrypted with MPEG protocol.

18. The remote control of claim 14 wherein said complete video presentation represented by said raw data or video signal is a movie.

19. A remote control constructed and arranged for direct TV operation and including:
    a keyboard having keys for selecting a television channel;
    means for coupling a data storage unit to said remote control;
    means for retrieving raw data or a video signal, representing a complete video presentation to be displayed and/or broadcast, from said data storage unit said raw data or video signal being encoded or encrypted with WINK communications protocol; and
    means for directing signals containing the raw data or the video signal to a signal receiving device associated with a television set for causing the video presentation to be displayed or broadcast.

20. A remote control constructed and arranged for direct TV operation and including:
    a keyboard having keys for selecting a television channel;
    means for coupling a data storage unit to said remote control;
    means for retrieving raw data or a video signal, representing a complete video presentation to be displayed and/or broadcast, from said data storage unit said raw data or video signal being encoded and encrypted with ICAP protocol; and
    means for directing signals containing the raw data or the video signal to a signal receiving device associated with a television set for causing the video presentation to be displayed or broadcast.

21. A remote control constructed and arranged for direct TV operation and including:
    a keyboard having keys for selecting a television channel;
    means for coupling a data storage unit to said remote control;
    means for retrieving raw data or a video signal, representing a complete video presentation to be displayed and/or broadcast, from said data storage unit said raw data or video signal being encoded and encrypted with MPEG protocol; and means for directing signals containing the raw data or the video signal to a signal receiving device associated with a television set for causing the video presentation to be displayed or broadcast.

22. A remote control constructed and arranged for direct TV operation and including:

a keyboard having keys for selecting a television channel;

means for coupling a data storage unit to said remote control;

means for retrieving raw data or a video signal, representing a complete video presentation to be displayed and/or broadcast, from said data storage unit;

said raw data or video signal in said storage unit being encoded and encrypted and said complete video presentation represented by said raw data or video signal being a movie, and means for directing signals containing the raw data or the video signal to a signal receiving device associated with a television set for causing the video presentation to be displayed or broadcast.

23. A remote control constructed and arranged for direct TV operation and including:

a keyboard having keys for selecting a television channel;

means for mounting a data storage unit within said remote control;

means for retrieving raw data or a video signal, representing a complete video presentation to be displayed and/or broadcast, from said data storage unit;

said raw data or video signal in said storage unit being encoded or encrypted;

decoding circuitry in said remote control for decoding encoded or encrypted raw data or video signal received from said data storage unit; and means for directing signals containing the raw data or the video signal to a signal receiving device associated with a television set for causing the video presentation to be displayed or broadcast.

24. A remote control constructed and arranged for direct TV operation and including:

a keyboard having keys for selecting a television channel;

means for mounting a data storage unit to said remote control;

means for retrieving raw data or a video signal, representing a complete video presentation to be displayed and/or broadcast, from said data storage unit;

said raw data or video signal in said data storage unit being encoded or encrypted with WINK communications protocol; and means for directing signals containing the raw data or the video signal to a signal receiving device associated with a television set for causing the video presentation to be displayed or broadcast.

25. A remote control constructed and arranged for direct TV operation and including:

a keyboard having keys for selecting a television channel;

means for mounting a data storage unit to said remote control;

means for retrieving raw data or a video signal, representing a complete video presentation to be displayed and/or broadcast, from said data storage unit;

said raw data or video signal in said data storage unit being encoded or encrypted with ICAP communications protocol; and means for directing signals containing the raw data or the video signal to a signal receiving device associated with a television set for causing the video presentation to be displayed or broadcast.

26. A remote control constructed and arranged for direct TV operation and including:

a keyboard having keys for selecting a television channel;

means for mounting a data storage unit to said remote control;

means for retrieving raw data or a video signal, representing a complete video presentation to be displayed and/or broadcast, from said data storage unit;

said raw data or video signal being encoded or encrypted with MPEG protocol; and means for directing signals containing the raw data or the video signal to a signal receiving device associated with a television set for causing the video presentation to be displayed or broadcast.

27. A remote control constructed and arranged for direct TV operation and including:

a keyboard having keys for selecting a television channel;

means for mounting a data storage unit to said remote control;

means for retrieving raw data or a video signal, representing a complete video presentation to be displayed and/or broadcast, from said data storage unit;

said raw data or video signal in said data storage unit is encoded or encrypted and said complete video presentation represented by said raw data or video signal being a movie; and means for directing signals containing the raw data or the video signal to a signal receiving device associated with a television set for causing the video presentation to be displayed or broadcast.

* * * * *